(12) United States Patent (10) Patent No.: US 8,392,823 B1
Schneider et al. (45) Date of Patent: Mar. 5, 2013

(54) SYSTEMS AND METHODS FOR DETECTING HIDDEN TEXT AND HIDDEN LINKS

(75) Inventors: Fritz Schneider, San Francisco, CA (US); Matt Cutts, Mountain View, CA (US)

(73) Assignee: Google Inc., Mountain View, CA (US)

( * ) Notice: Subject to any disclaimer, the term of this patent is extended or adjusted under 35 U.S.C. 154(b) by 457 days.

(21) Appl. No.: 12/547,157

(22) Filed: Aug. 25, 2009

Related U.S. Application Data

(63) Continuation of application No. 10/726,483, filed on Dec. 4, 2003, now abandoned.

(51) Int. Cl.
*G06F 17/00* (2006.01)
(52) U.S. Cl. ........ 715/234; 715/235; 715/243; 715/200; 715/204; 715/205; 715/209
(58) Field of Classification Search .......... 715/234–235, 715/209, 243, 200, 204, 255
See application file for complete search history.

(56) References Cited

U.S. PATENT DOCUMENTS

| | | | | |
|---|---|---|---|---|
| 5,557,722 | A * | 9/1996 | DeRose et al. | 715/234 |
| 5,644,776 | A * | 7/1997 | DeRose et al. | 715/234 |
| 5,708,806 | A * | 1/1998 | DeRose et al. | 1/1 |
| 5,983,248 | A * | 11/1999 | DeRose et al. | 715/234 |
| 6,055,544 | A * | 4/2000 | DeRose et al. | 1/1 |
| 6,101,511 | A * | 8/2000 | DeRose et al. | 715/234 |
| 6,101,512 | A * | 8/2000 | DeRose et al. | 715/234 |
| 6,105,044 | A * | 8/2000 | DeRose et al. | 715/234 |
| 6,167,409 | A * | 12/2000 | DeRose et al. | 715/234 |
| 6,442,606 | B1 | 8/2002 | Subbaroyan et al. | 709/224 |
| 6,546,406 | B1 * | 4/2003 | DeRose et al. | 715/234 |
| 6,763,388 | B1 | 7/2004 | Tsimelzon | 709/228 |
| 6,809,741 | B1 * | 10/2004 | Bates et al. | 345/597 |
| 6,934,909 | B2 * | 8/2005 | Tewari | 715/234 |
| 6,966,029 | B1 * | 11/2005 | Ahern | 715/234 |
| 7,310,769 | B1 * | 12/2007 | Dash | 715/269 |
| 7,826,112 | B2 * | 11/2010 | Sawada | 358/520 |
| 7,921,159 | B1 * | 4/2011 | Cooley | 709/206 |
| 2001/0019427 | A1 * | 9/2001 | Komatsu | 358/1.18 |
| 2002/0078100 | A1 * | 6/2002 | Tewari | 707/523 |
| 2005/0022115 | A1 | 1/2005 | Baumgartner et al. | 715/205 |

OTHER PUBLICATIONS

Copending U.S. Appl. No. 10/726,483, filed Dec. 4, 2003, Fritz Schneider et al., "Systems and Methods for Detecting Hidden Text and Hidden Links".
Bohman et al, "An Accessible Method of Hiding HTML Content," published Jun. 2003, ACM Press, Issue 76, pp. 11-12, + 1 title page (3 pages total) <http://portal.acm.org/ft_gateway.cfm?id=1036406&type=pdf&coll=ACM&dl=ACM&CFID=67325396&CFTOKEN=75842128>.
Hegaret et al, What is the Document Object Model?, published Nov. 7, 2003, W3C, pp. 1-8, <http://www.w3.org/TR/2003/CR-DOM-Level-3-Core-20031107/>.
EchoEcho.com, "CSS Tutorial: CSS Layers," Oct. 2, 2003, EchoEcho.com, pp. 1-5, <http://web.archive.org/web/20031002235947/http://www.echoecho.com/csslayers.htm>.
Sam, "Introduction to DOM," Nov. 5, 2003, OxfordU.net, http://web.archive.org/web/20031105175619/http://www.oxfordu.net/webdesign/dom/straight_text.html, pp. 1-7.

* cited by examiner

*Primary Examiner* — Cesar Paula
*Assistant Examiner* — David Faber
(74) *Attorney, Agent, or Firm* — Harrity & Harrity, LLP

(57) ABSTRACT

A system detects hidden elements in a document that includes a group of elements. The system may identify each of the elements in the document and create a structural representation of the document. The structural representation may provide an interconnection of the group of elements in the document. The system may also determine whether one or more elements of the group of elements are hidden based at least in part on locations or other attributes or properties of the one or more elements in the structural representation.

23 Claims, 6 Drawing Sheets

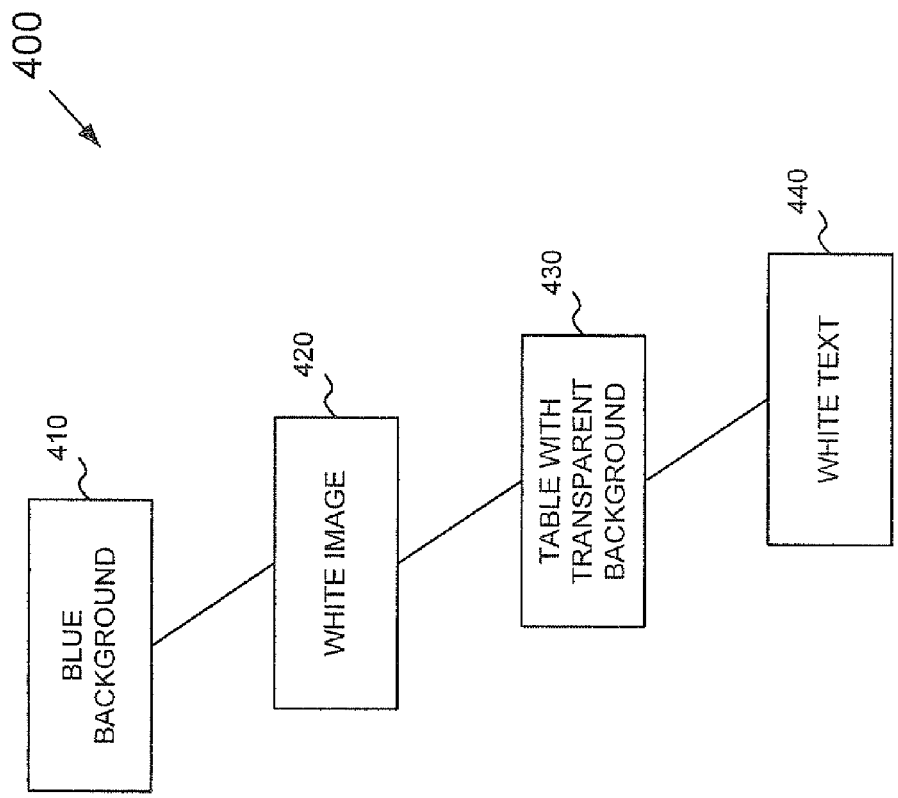

```
<html>
<head>
<title>Page Title</title>
<style><!--body, h1, h2 { color: #000001; font-size: 1px; } --> </style>
<link rel="stylesheet" type="text/css" href="invisible.css">
</head>
<body bgcolor=#000000 text=#FFFFFF>
<h4>
<center>
<table bgcolor=#EEEEEE>
<tr>
<td>
Free membership--click to join!
</td>
<td>
<font color=#EFEFEF>
dirty nasty schoolgirl discipline swingers cartoons
</font>
</td>
<td>
<div class=invis>
free buy cheap online porn videos
</div>
</td>
</tr>
</table>
</center>
</h4>
<h2>
porno erotik sexe sexo sex teen Britney Spears incest stories
porno erotik sexe sexo sex teen Britney Spears incest stories
...
</body>
</html>
```

FIG. 5

SYSTEMS AND METHODS FOR DETECTING HIDDEN TEXT AND HIDDEN LINKS

CLAIM OF BENEFIT TO PRIOR APPLICATION

This application is a continuation of U.S. patent application Ser. No. 10/726,483, filed Dec. 4, 2003, and titled "Systems and Methods for Detecting Hidden Text and Hidden Links," the disclosure of which is incorporated herein by reference.

FIELD OF THE INVENTION

The present invention relates generally to communication systems and, more particularly, to systems and methods for detecting hidden text and hidden links in documents.

BACKGROUND OF THE INVENTION

Networks, such as the Internet, have become an increasingly important part of our everyday lives. Millions of people now access the Internet on a daily basis to shop for goods and services, obtain information of interest (e.g., movie listings, news, etc.), and communicate with friends, family, and co-workers (e.g., via e-mail or instant messaging).

Currently, when a person wishes to purchase a product or simply find information on the Internet, the person enters into his/her web browser a Uniform Resource Locator (URL) pertaining to a web site of interest in order to access that particular web site. The person then determines whether the product or information of interest is available at that particular web site.

When the person does not know where to go to find, for example, a desired product, the person may "search" for web sites that sell the product using a search engine. For example, suppose a person wishes to purchase a laser printer via the Internet. The person may access a web site that includes a conventional search engine. The person may enter one or more terms relating to the product, such as "laser printer," into the search engine to attempt to locate web sites that sell that product. Searching for products or information of interest in this manner has become very popular. As such, companies often desire to have their web site(s) listed very highly in search results, thinking that a highly ranked listing will result in increased sales.

Many techniques exist that allow companies to obtain a highly ranked listing. For example, some search engines allow companies to buy certain search terms. If a search query is received with those search terms, then the company that has purchased those search terms may be ranked more highly than other companies offering the same product. In other situations, a webmaster for a company may attempt to "trick" the search engine into listing the company's web site more highly.

For example, one of the most deceptive techniques that webmasters use to trick a search engine is called "cloaking" In this situation, a webmaster causes a different document to be displayed to users than what is presented to search engine spiders. Webmasters may attempt to hide text and/or links from users, but not from search engine spiders, in order to cause their documents to be ranked more highly than their competitors. When hiding text, webmasters may make the text color the same as or similar to the color of the background. Therefore, the text is not visible to a user viewing the document, but would still be considered by search engines that rank documents based on words in the document. A related trick is to use an image that is the same or very similar in color to the text that the webmaster wants to hide. The image can be a background image or other types of images. For example, a webmaster may place a small blue bar image in the middle of the displayed document with blue text mostly on top of or underneath the image.

One technique for hiding links involves the use of a very small image (e.g., a 1×1 pixel graphic interchange format (GIF)) that is used as a hyperlink. The image can be made to be so small that the image is not visible to users viewing the document, but may still be considered by search engines when ranking documents. In other situations, large images (e.g., 300 pixels wide and 200 pixels high) that are hyperlinks may be used that are the same color or similar color to the background.

Webmasters also use Cascading Style Sheets (CSS) and JavaScript to hide text and links in a document. For example, CSS allows webmasters to mark a block of text as "hidden." Text in a document can also be set to a font size of 1 pixel high, for example, so as not to be visible to viewers of the document. CSS also allows text to be positioned using absolute numbers/spacing. Therefore, webmasters can position text or links to the left/right or above/below the visible area. CSS allows for layers of elements to be presented to users. For example, the "Z-ordering" of an element (e.g., text) can be set such that the layer with text is obscured below a visible layer. Webmasters may also use JavaScript to dynamically modify a document so as to include one of more of the tricks described above. JavaScript can also be used to dynamically modify a document by removing original content from a document and replace it with new content. Webmasters may store the JavaScript and CSS in external files, which search engine spiders normally do not fetch. This makes detection of these tricks more difficult.

Therefore, there exists a need for systems and methods for improving the ability to detect hidden items in a document.

SUMMARY OF THE INVENTION

Implementations consistent with the principles of the invention detect hidden text, links, and/or other objects in documents.

In accordance with one implementation consistent with the principles of the invention, a method for detecting hidden elements in a document that includes a group of elements is provided. The method may include identifying each of the elements in the document and creating a structural representation of the document. The structural representation may provide an interconnection of the group of elements in the document. The method may further include determining whether one or more elements of the group of elements are hidden based at least in part on locations of the one or more elements in the structural representation.

In another implementation consistent with the principles of the invention, a server includes a processor and a memory. The processor may be configured to generate a structural representation of a document that includes a group of elements. The structural representation may identify an interconnection of the elements and a color associated with each element. The processor may also be configured to detect that one element of the group of elements is hidden based at least in part on the colors associated with the one element and an element to which the one element is interconnected.

In a further implementation consistent with the principles of the invention, a method for detecting hidden elements in a document that includes a group of elements is provided. The method may include creating a structural representation of the document, where the structural representation identifies an interconnection of the group of elements and one or more properties associated with each element in the group of elements. The method may further include determining that one element in the group of elements is hidden based at least in part on the one or more properties associated with the one element and the one or more properties associated with another element that is connected to the one element.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is an exemplary diagram of a tree-like structure of a document in an implementation consistent with the principles of the invention;

FIG. 5 is an exemplary hyper text markup language (HTML) document; and

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Implementations consistent with the principles of the invention can determine whether a document includes hidden text, links, and/or other objects. In this way, the ranking of search results may take into account attempts to trick the search engine into ranking results more highly.

Exemplary System

Figure 1:
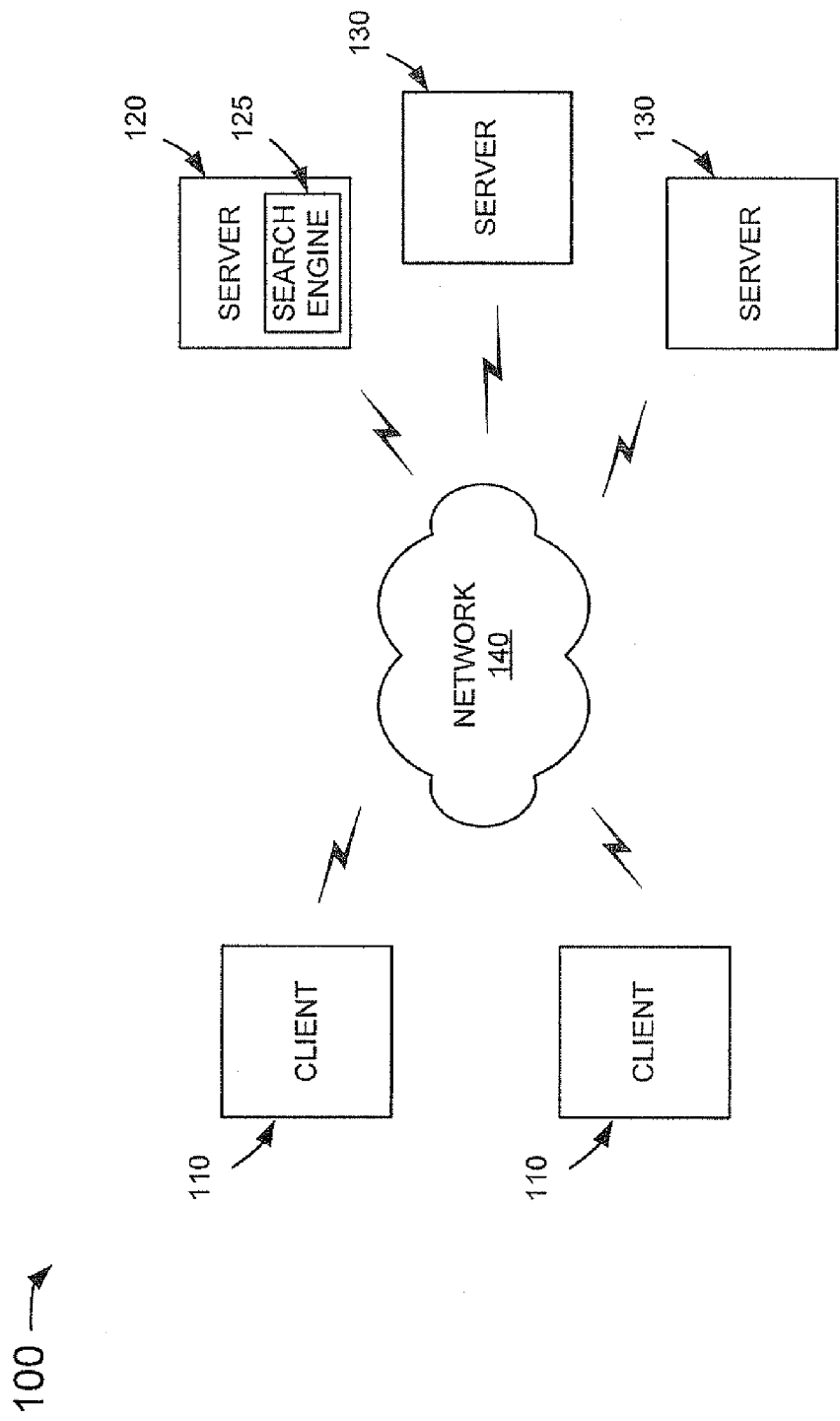
FIG. 1 is an exemplary diagram of a system in which systems and methods consistent with the principles of the invention may be implemented.

FIG. 1 is an exemplary diagram of a system 100 in which systems and methods consistent with the principles of the invention may be implemented. System 100 may include multiple clients 110 connected to servers 120 and 130 via a network 140. Network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120/130 have been illustrated as connected to network 140 in FIG. 1 for simplicity. In practice, there may be more or fewer clients 110 and/or servers 120/130. Also, in some instances, a client 110 may perform the functions of a server 120/130 and a server 120/130 may perform the functions of a client 110.

Clients 110 may include devices, such as wireless telephones, personal computers, personal digital assistants (PDAs), lap tops, etc., threads or processes running on these devices, and/or objects executable by these devices. Servers 120/130 may include server devices, threads, and/or objects that operate upon, search, or maintain documents in a manner consistent with the principles of the invention. Clients 110 and servers 120/130 may connect to network 140 via wired, wireless, or optical connections.

In an implementation consistent with the principles of the invention, server 120 may include a search engine 125 usable by clients 110. Servers 130 may store objects (or web documents) accessible by clients 110.

Exemplary Server Configuration

Figure 2:
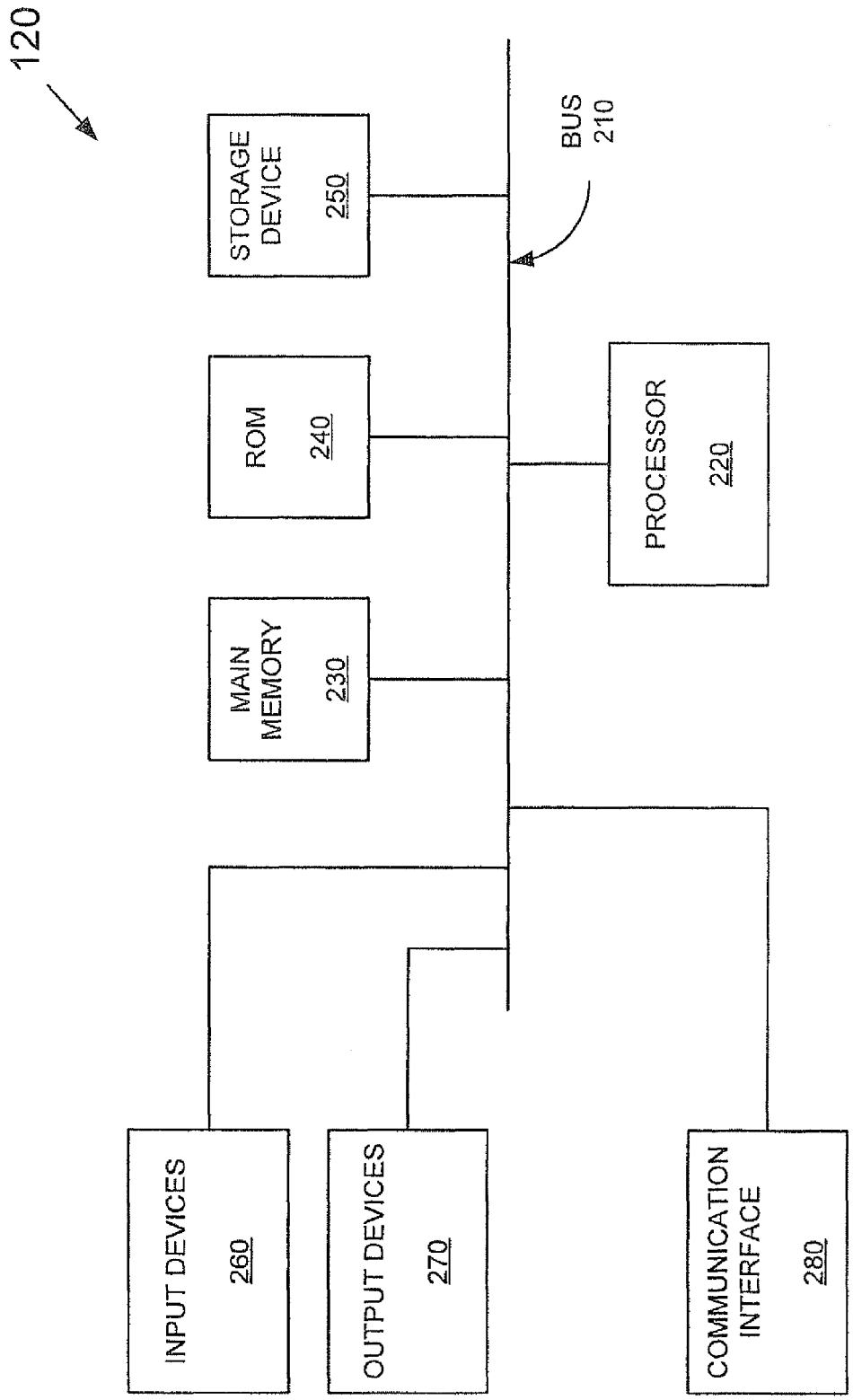
FIG. 2 is an exemplary diagram of the server of FIG. 1 in an implementation consistent with the principles of the invention.

FIG. 2 is an exemplary diagram of server 120 in an implementation consistent with the principles of the invention. Clients 110 and servers 130 may be similarly configured. Server 120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of server 120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input devices 260 may include one or more conventional mechanisms that permit a user to input information to server 120, such as a keyboard, a mouse, a pen, one or more biometric mechanisms, such as a voice recognition device, etc. Output devices 270 may include one or more conventional mechanisms that output information to the user, including a display, a printer, a speaker, etc. Communication interface 280 may include any transceiver-like mechanism that enables server 120 to communicate with other devices and/or systems. For example, communication interface 280 may include mechanisms for communicating with another device or system via a network, such as network 140.

As will be described in detail below, server 120, consistent with the principles of the invention, may detect hidden text and/or hidden links in a document. Server 120 may perform these operations in response to processor 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, the invention is not limited to any specific combination of hardware circuitry and software.

Exemplary Processing

Figure 3:
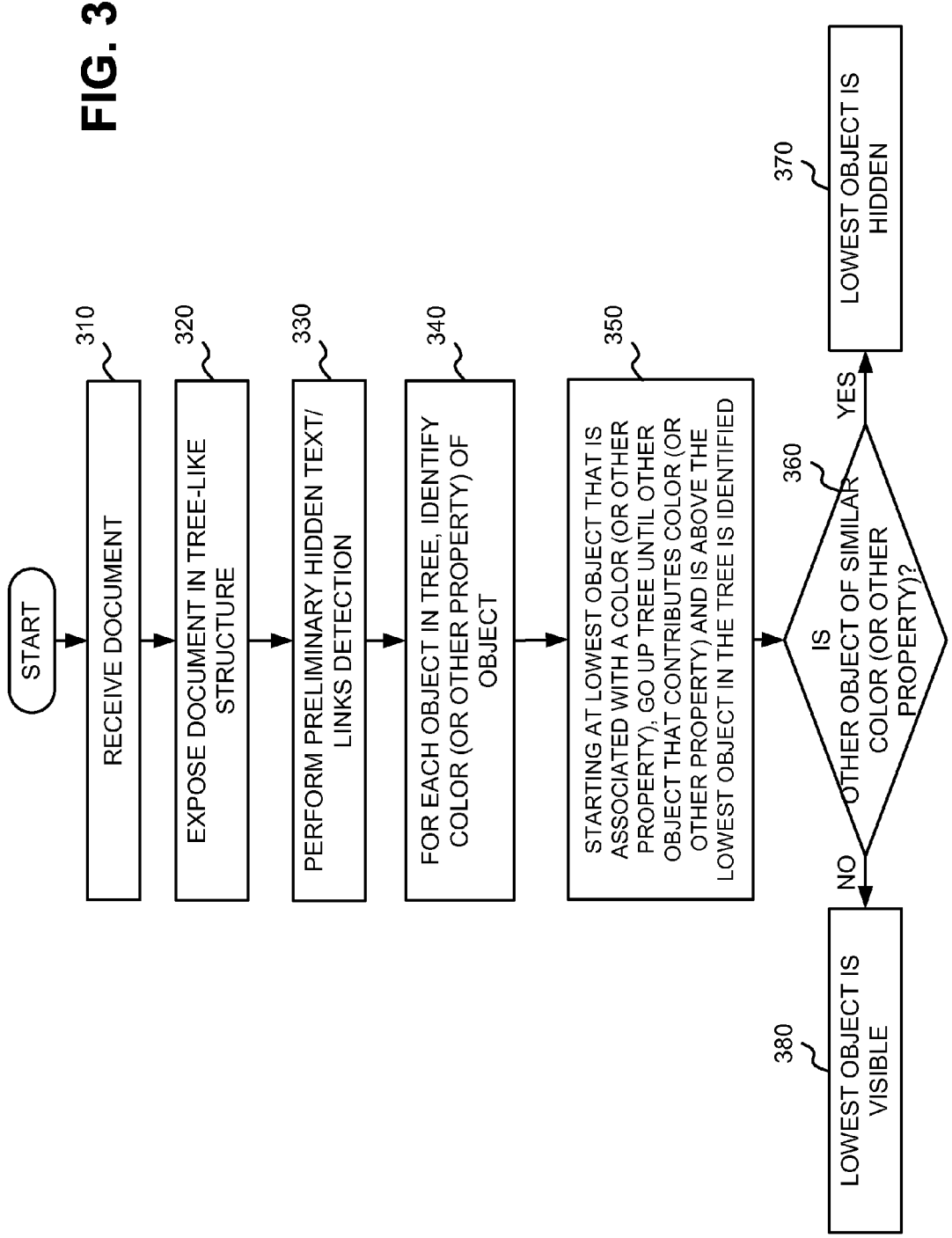
FIG. 3 is a flow chart of an exemplary process for detecting hidden text and hidden links in a document in an implementation consistent with the principles of the invention.

FIG. 3 is a flow chart of an exemplary process for detecting hidden text and hidden links in a document in an implementation consistent with the principles of the invention. The process described below may be performed automatically by, for example, server 120 or manually by a human operator. In alternative implementations, parts of the process described below may be performed automatically while other parts may be performed manually.

Processing may begin by receiving a document, such as a web page (act 310). In one implementation consistent with the principles of the invention, server 120 may, for example, receive the document in connection with a network search or a crawling and indexing operation. For example, server 120 may receive a search query from a client 110 and retrieve one or more documents in a well known manner in response to the search query. Alternatively, the document may be received in response to a complaint about the document from a user of server 120 (or for other reasons). In one implementation, server 120 may receive the document in a hyper text markup language (HTML) format.

Server 120 may expose the HTML document in a tree-like structure (or in another structure that can represent nesting blocks of HTML) (act 320). In one implementation, server 120 may use an application programming interface (API), such as the Document Object Model (DOM), to provide a structural representation (e.g., an object-oriented representation) of the document and its elements (e.g., division or section, heading, paragraph, image, list, etc.). The structural representation may also indicate the size, positioning, layer-order, visibility information, color, and/or other properties associated with the elements in the document.

As an example, assume that a document has a blue background, a white background image placed on the blue background, and white text written in a table having a transparent background that that is placed on the background image. FIG. 4 illustrates an exemplary tree-like structure 400 in which the document may be represented. As illustrated, tree-like structure 400 may include a background object 410, an image object 420, a table object 430, and a text object 440. Background object 410 may serve as the root object in tree-like structure 400. Since the background image is placed on the background, image object 420 is the next node in tree-like structure 400. A table having a transparent background is placed on the image. Therefore, table object 430 is the next node in tree-like structure 400. Text object 440 would be the last object in tree-like structure 400.

Server 120 may determine whether any text/links in the document are hidden based on size, position, layer-order, visibility, etc. (act 330). For example, server 120 may determine whether text in the document has been set to a small font size (e.g., one pixel) that is invisible to a viewer of the document. This may be an indication that the text is hidden. Server 120 may also determine whether a link (or image) has been set to a small size (e.g., 1×1 pixel). This may be an indication that the link is hidden. Some webmasters use 1×1 pixel images to track users that visit their site. For example, www.extreme-dm.com currently offers a tracker that shows unique visitors over time, what browsers users employed, where users came from when visiting the site, etc. Server 120 may exclude those images or links that are associated with statistical or tracking programs that are used to aggregate visitor information from the hidden link determination. Server 120 may exclude images based at least in part on, for example, whether the destination image, link, or anchor text contain words associated with statistical programs (e.g., "stats," "track," "log," "click," etc.).

Server 120 may also determine whether the text/links are positioned off-screen (i.e., out of view of a user loading the document in his/her web browser) or whether the layer in which the text/links appear is positioned below one or more other layers. Moreover, server 120 may determine whether the text/links are marked as hidden, for example, through the use of CSS. Server 120 may detect hidden text/links that are hidden using the above techniques by, for example, checking CSS properties of elements in the document to determine if elements have been indicated as invisible, determining the current (x, y) screen position of each element and then checking the height and width of the browser window to determine whether any of the elements are positioned off-screen, and checking the CSS properties of elements in the document to determine if the elements are too small in size to be visible to the naked eye. Server 120 may also detect whether text/links are hidden due to another element (e.g., an image) being positioned on top of the text/links. Here, server 120 may check the CSS properties of elements in the document to determine if elements overlap. Server 120 may, for example, determine the (x, y) position of an element and then determine if other elements fall under it based at least in part on their height, width, (x, y) position, and Z-index (or depth). In some instances, server 120 may identify multiple elements stacked on top of each other in a document.

For each object in the tree-like structure, server 120 may identify the color of the object (act 340). In the example above, server 120 may identify the color of the background associated with background object 410 as blue, the color of the background image associated with image object 420 as white, and the color of the text associated with text object 440 as white. Server 120 may also determine that the table associated with table object 430 is not associated with a color since the background of the table is transparent.

Server 120 may move up the tree-like structure, starting with the lowest object that is associated with a color in the tree-like structure, and then identify the next highest object that is above the lowest object in the tree-like structure and is associated with a color (act 350). In the example above, server 120 may start with text object 440 and then move up tree-like structure 400 to image object 420. Image 420 is the next highest object in tree-like structure 400 that is associated with a color since table object 430 is not associated with a color. It will be appreciated that, although image 420 is described as being higher than text object 440 in tree-like structure 400, image 420 is actually under text object 440 in the document.

Server 120 may determine if the two objects (e.g., text object 440 and image object 420 in the example above) are associated with the same or similar colors (act 360). In one implementation consistent with the principles of the invention, colors may be represented as a color value (e.g., #RRGGBB), where each number, such as RR, is a two-digit hexadecimal number that ranges from 00 to FF, which is equal to 255. It will be appreciated that other techniques for representing colors may alternatively be used. For example, colors may be specified by name (e.g., "blue"), a hex triplet (e.g., "#30f"), or any other valid method of specifying colors in HTML documents or non-HTML documents. Colors may also be specified in other types of spaces, such as hue/saturation/brightness, cyan/magenta/yellow/black, etc. Regardless of the way in which colors are specified, if two colors have the same color value (or name), server 120 may determine that the colors are the same. In the example described above with respect to FIG. 4, server 120 may determine that text object 440 and image object 420 are of the same color (i.e., white).

If two colors are not the same (i.e., are not associated with identical color values/names), server 120 may determine that the two colors are similar if they are within a configurable range, or a predetermined range, etc. For example, when the colors are represented as color values, server 120 may determine that two colors are similar if their color values are within 50 (or some other value) levels of color of each other. Assume, for instance, that image object 420 has a color of #000000, which is solid black, while text object 440 has a color of #050505, which is very, very dark, but not completely black. Server 120 may determine that image object 420 and text object 440 are of a similar color since their color values are within a predetermined range (i.e., 50), or because their color values are within a relatively close range (i.e., objects may be considered to be hidden/obscured when their closeness in color is high relative to the closeness in color of other things).

If server 120 determines that the objects have the same colors or similar colors, server 120 may determine that the lowest object is hidden (act 370). In the example described above with respect to FIG. 4, server 120 would determine that the text in text object 440 is hidden since the color of text object 440 and image object 420 are the same (i.e., white). In one implementation, server 120 may ignore the hidden text when ranking the document. If, on the other hand, server 120 determines that the objects do not have the same colors or similar colors, server 120 may determine that the lowest object is visible (act 380).

Figure 6:
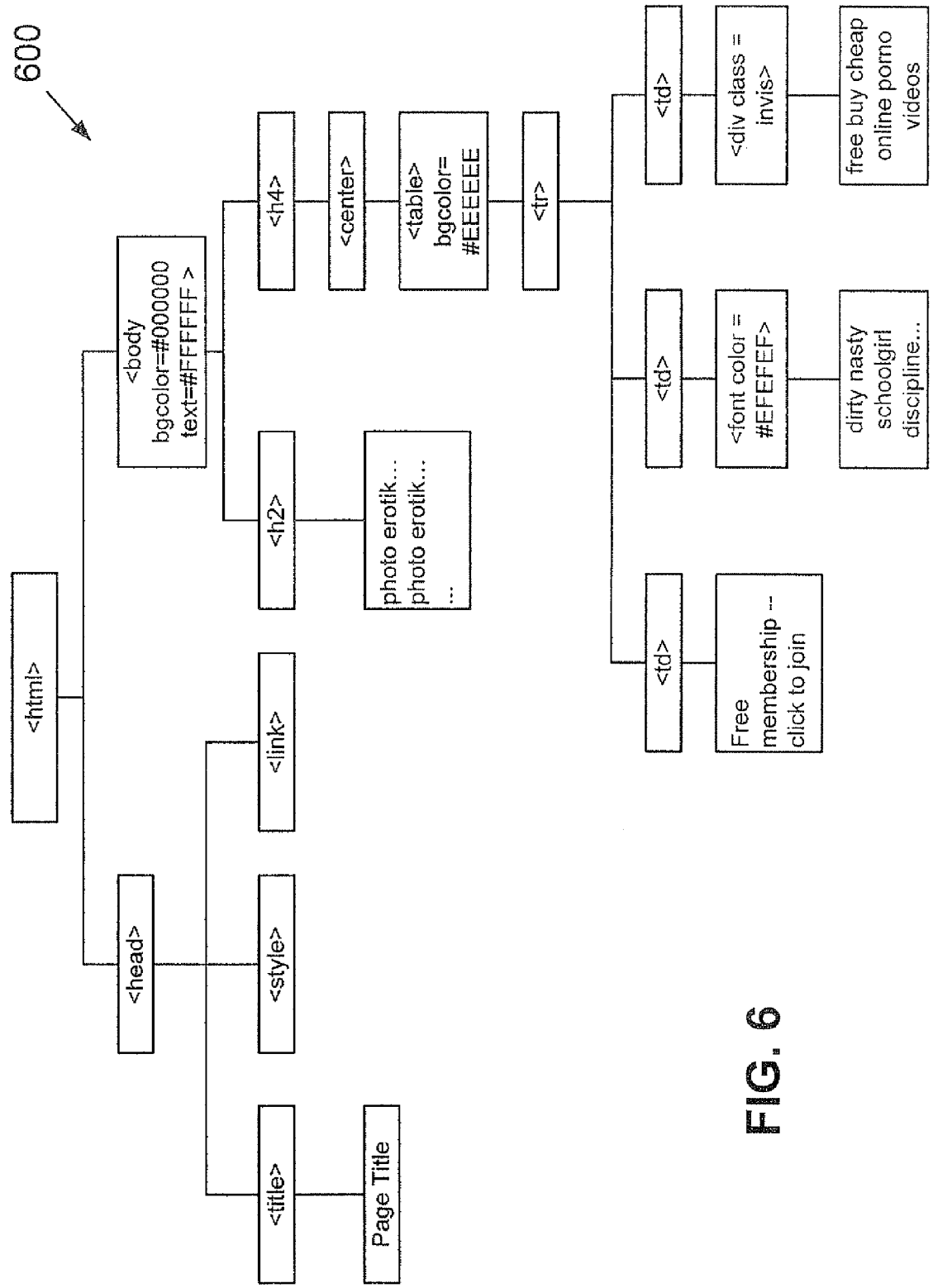
FIG. 6 is an exemplary structural representation of the HTML document of FIG. 5 in an implementation consistent with the principles of the invention.

As another example of locating hidden text/links in a document, assume that server 120 receives a document, such as the HTML document 500 illustrated in FIG. 5 (act 310). Server 120 may expose HTML document 500 in a structural representation, such as the tree-like structure 600 illustrated in FIG. 6 (act 320). Server 120 may then run one or more preliminary tests to determine if document 500 includes hidden text/links (act 330). In this example, server 120 may detect that the webmaster has overridden the value of the <h2> tag. Normally, the "h2" tag is a heading size, in which H1 is very large, H2 is a little smaller, H3 is smaller still, etc. Here, the webmaster has used CSS to override the value of h2 to mean "for all text in the H2 section, make the text color almost completely black, and make the height of the font be about one pixel high." A viewer of this document would not see the text because it is so small, but a search engine may determine that the text is relatively important because of the H2 heading label. In this situation, server 120 may determine that the text in the H2 section is very small, which can indicate that the webmaster is attempting to hide the text in this section.

Server 120 may then identify the color of each object in tree-like structure 600 (act 340). In the example, document 500 has a black background (#000000) with an almost completely-white table (#EEEEEE) in the center of the page. The table includes 3 cells, each containing text. The first cell includes the visible text "Free membership—click to join." The second cell includes the text "dirty nasty schoolgirl discipline swingers cartoons." The text in the second cell is of the color #EFEFEF, which is nearly white. The third cell includes the text "free buy cheap online porn videos." The text in the third cell has the font color set by a CSS style called "invis," which is stored in an external file. Assume that when the external file is loaded, server 120 determines that the invis style marks the text in the third cell as #EEEEEE.

Server 120 may start with an object at the bottom of tree-like structure 600 (e.g., the text in the first cell) and march up tree-like structure 600 until another object that contributes color is encountered (act 350). Here, the next object in tree-like structure 600 that contributes color is the table, which is almost completely white (#EEEEEE). Server 120 may then determine if the color of the text in the first cell is the same as or similar to the color of the table (i.e., whether the text in the first cell is white or similar to white) (act 360). For document 500, server 120 would determine that the color of the text in the first cell is black and, therefore, that the text in the first cell is visible (act 380).

Server 120 may then analyze the second cell in a similar manner. In this situation, server 120 may march up tree-like structure 600 until another object that contributes color is encountered (act 350). Here, the next object in tree-like structure 600 that contributes color is the table, which is almost completely white (#EEEEEE). Server 120 may then determine if the color of the text in the second cell is the same as or similar to the color of the table (i.e., whether the text in the second cell is white or similar to white) (act 360). For document 500, server 120 would determine that the color of the text in the second cell is nearly white (#EFEFEF). Since the colors of the table and the text in the second cell are very similar, server 120 would determine that the text in the second cell is hidden (act 370).

Server 120 may then analyze the third cell in a similar manner. In this situation, server 120 may march up tree-like structure 600 until another object that contributes color is encountered (act 350). Here, the next object in tree-like structure 600 that contributes color is the table, which is almost completely white (#EEEEEE). Server 120 may then determine if the color of the text in the third cell is the same as or similar to the color of the table (i.e., whether the text in the third cell is white or similar to white) (act 360). For document 500, server 120 would determine, as set forth above, that the color of the text in the third cell is nearly white (#EFEFEF). Since the colors of the table and the text in the third cell are very similar, server 120 would determine that the text in the third cell is hidden (act 370). Server 120 may ignore the hidden text in the H2 section, as well as the text in the second and third cells of the table, when ranking or indexing document 500.

CONCLUSION

Implementations consistent with the principles of the invention can determine whether a document includes hidden text, links, and/or other objects. In this way, the ranking of search results may take into account attempts to trick the search engine into ranking results more highly (e.g., by ignoring text that the user would not see when analyzing the content of the document).

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, in those situations where, for example, JavaScript is used to dynamically change the content of a document, server 120 may monitor the tree-like structure associated with the document for changes. If more than a predetermined amount of text is added to (or deleted from) the document, the document may be further analyzed to determine if the document is being used to trick a search engine into ranking the document more highly.

Moreover, the above-described functions need not be performed by server 120. In other implementations, one or more of the acts described in FIG. 3 may be performed by a client 110. For example, a browser assistant (i.e., software that operates in conjunction with a conventional web browser) may perform one or more of the acts described with respect to the process of FIG. 3.

While a series of acts has been described with regard to FIG. 3, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A method comprising:
   identifying, by one or more processors associated with one or more computer devices, a plurality of elements included in a document;
   determining, by one or more processors associated with one or more computer devices, a hierarchical structural representation of the document, the hierarchical structural representation reflecting an interconnection of the plurality of elements in the document; and
   determining, by one or more processors associated with one or more computer devices, whether one or more of the plurality of elements are hidden based on locations of the one or more of the plurality of elements and the hierarchical structural representation,
   where the determining whether the one or more of the plurality of elements are hidden includes:
      identifying respective color values associated with the plurality of elements,
      identifying a first element, of the plurality of elements, that is associated with a first color value of the respective color values,
      identifying a second element, of the plurality of elements, that is associated with a second color value of the respective color values, where the first and second color values are included within a particular range of color values, and where the second element appears behind the first element when the document is rendered, and
      determining that the first element is hidden when no intervening element is located between the first and second elements,
      the first element being not hidden when at least one intervening element, that is associated with a third color value, is located between the first and second elements, where the third color value is outside of the particular range of color values.

2. The method of claim 1, further comprising:
   determining that the first element is hidden when a third element is located between the first and second elements, where the third element is not associated with any color value.

3. The method of claim 1, where the second color value is different than a color value of a background of the document.

4. The method of claim 1, further comprising:
   determining an outer periphery, based on a Cartesian coordinate system, associated with a web browser of a client device that displays the document,
   determining a Cartesian coordinate associated with each of the plurality of elements within the Cartesian coordinate system when the document is displayed via the web browser, and
   determining that at least one of the plurality of elements is hidden when the at least one of the plurality of elements is associated with a corresponding Cartesian coordinate that is positioned outside of the outer periphery of the web browser.

5. The method of claim 4, further comprising:
   determining that the at least one of the plurality of elements is visible when the at least one of the plurality of elements is associated with a corresponding Cartesian coordinate that is positioned within the outer periphery.

6. The method of claim 1, where the plurality of elements includes at least one of text or links.

7. The method of claim 1, where determining the hierarchical structural representation of the document includes:
   creating a tree-like structure, where each of the plurality of elements corresponds to a node within the tree-like structure.

8. The method of claim 1, further comprising:
   determining whether one or more other elements, of the plurality of elements, are hidden based on properties associated with the one or more other elements.

9. The method of claim 8, where the properties include visibility indications associated with the one or more other elements, and
   where determining whether the one or more other elements, of the plurality of elements, are hidden is based on the visibility indications associated with the one or more other elements.

10. The method of claim 8, where determining whether the one or more other elements, of the plurality of elements, are hidden is based on a size associated with the one or more other elements.

11. The method of claim 1, where determining whether the one or more of the plurality of elements are hidden based on locations of the one or more elements and the hierarchical structural representation includes:
    determining whether a location of one of the one or more elements is at least partially beneath a location of another one of the one or more elements.

12. A server comprising:
    a hardware memory device to store instructions; and
    a processor, connected to the memory device, to execute the instructions to:
       receive a document comprising a plurality of elements,
       determine a structural representation of the document, the structural representation reflecting an interconnection of the plurality of elements in the document, and
       identify hidden elements in the document based on locations of the plurality of elements and the structural representation,
    where when identifying the hidden elements, the processor is further to:
       identify respective color values associated with the plurality of elements,
       identify a first element, of the plurality of elements, that is associated with a first color value of the respective color values,
       identify a second element, of the plurality of elements, that is associated with a second color value of the respective color values, where the first and second color values are within a particular range of color values, and where the second element appears behind the first element when the document is rendered,
       determine that the first element is hidden when no intervening element is located between the first and second elements, and
       determine that the first element is not hidden when at least one intervening element, that is associated with a third color value, is located between the first and second elements, where the third color value is not within the particular range of color values.

13. The server of claim 12, where the processor is further to:
    determine that the first element is hidden when a third element is located between the first and second elements, where the third element is not associated with a color value.

14. The server of claim 12, where the second color value is different from a color value of a background of the document.

15. The server of claim 12, where, when determining the structural representation of the document, the processor is further to:
    create a tree-like structure, where each of the plurality of elements is a node within the tree-like structure.

16. The server of claim 12, where the processor is to:
    determine that one or more elements, of the plurality of elements, are hidden when a visibility property associated with the one or more elements is set as invisible.

17. The server of claim 12, where the processor is further to:
    determine that one or more elements, of the plurality of elements, are hidden when a size, associated with the one or more elements, does not satisfy a threshold size.

18. The server of claim 12, where the processor is further to:
    determine a height and a width of a web browser of a client device that displays the document,
    determine whether one or more elements, of the plurality of elements, are hidden based on whether the one or more elements are positioned on-screen or off-screen,
    where a particular on-screen element, of the one or more elements, is associated with an (x, y) screen position within the height and the width of the web browser of the client device, and
    where a particular off-screen element, of the one or more elements, is associated with an (x, y) screen position outside at least one of the height or the width of the web browser of the client device.

19. The server of claim 12, where, when identifying the hidden elements in the document based on locations of the plurality of elements and the structural representation, the processor is further to:
    determine whether one of the plurality of elements is at least partially beneath another one of the plurality of elements when the document is rendered.

20. A non-transitory memory device containing instructions, the instructions comprising:
    one or more instructions that, when executed by at least one processor, cause the at least one processor to determine a hierarchical structural representation of a document, the hierarchical structural representation reflecting an interconnection of a plurality of elements included in the document; and
    one or more instructions that, when executed by the at least one processor, cause the at least one processor to identify hidden elements in the document based on the hierarchical structural representation, the one or more instructions to identify the hidden elements in the document based on the hierarchical structural representation including at least one of:
        one or more instructions to identify the hidden elements in the document further based on colors of the plurality of elements, where the one or more instructions to identify the hidden elements in the document further based on the colors of the plurality of elements include:
            one or more instructions to identify a respective color associated with each element of the plurality of elements,
            one or more instructions to identify a first element, of the plurality of elements, that is associated with a first color,
            one or more instructions to identify a second element, of the plurality of elements, that is associated with a second color, where the first and second colors are included in a particular range of colors, and where the second element appears behind the first element when the document is rendered,
            one or more instructions to determine that the first element is hidden when no intervening elements are located between the first and second elements, and
            one or more instructions to determine that the first element is not hidden when at least one intervening element, that is associated with a third color, is located between the first and second elements, where the third color is outside of the particular range of colors, or
        one or more instructions to identify the hidden elements in the document further based on locations of the plurality of elements in a Cartesian coordinate system, where the one or more instructions to identify the hidden elements in the document further based on the locations of the plurality of elements in the Cartesian coordinate system include:
            one or more instructions to determine an outer periphery, based on the Cartesian coordinate system, associated with a web browser of a client device that displays the document,
            one or more instructions to determine a Cartesian coordinate associated with each of the plurality of elements within the Cartesian coordinate system, and
            one or more instructions to determine that at least one of the plurality of elements is hidden when the at least one of the plurality of elements is associated with a corresponding at least one Cartesian coordinate that is positioned outside of the outer periphery.

21. The non-transitory memory device of claim 20, where the document includes hyper text markup language (HTML) and cascading style sheet (CSS) code, and
    where the instructions further comprise:
        one or more instructions that, when executed by the at least one processor, cause the at least one processor to determine that one or more of the plurality of elements are hidden when the CSS code overrides a pre-assigned value of at least one HTML tag associated with the one or more of the plurality of elements.

22. The method claim 1, where the document includes hyper text markup language (HTML) and cascading style sheet (CSS) code, and
    where the method further comprises:
        determining that at least one of the plurality of elements is hidden when the CSS code overrides a pre-assigned value of at least one HTML tag associated with the at least one of the plurality of elements.

23. The server of claim 12, where the document includes hyper text markup language (HTML) and cascading style sheet (CSS) code, and
    where the processor is further to:
        determine that at least one of the plurality of elements is hidden when the CSS code overrides a pre-assigned value of at least one HTML tag associated with the at least one of the plurality of elements.

* * * * *

UNITED STATES PATENT AND TRADEMARK OFFICE
CERTIFICATE OF CORRECTION

PATENT NO. : 8,392,823 B1
APPLICATION NO. : 12/547157
DATED : March 5, 2013
INVENTOR(S) : Fritz Schneider et al.

It is certified that error appears in the above-identified patent and that said Letters Patent is hereby corrected as shown below:

In the Claims:

Column 9, claim 4, lines 61-62, following the word "periphery" delete "of the web browser".

Signed and Sealed this
Twenty-first Day of May, 2013

Teresa Stanek Rea
*Acting Director of the United States Patent and Trademark Office*